March 24, 1942. T. T. WOODSON 2,277,427
MULTIPLE SEQUENCE RECORDER
Filed June 9, 1939    2 Sheets-Sheet 1
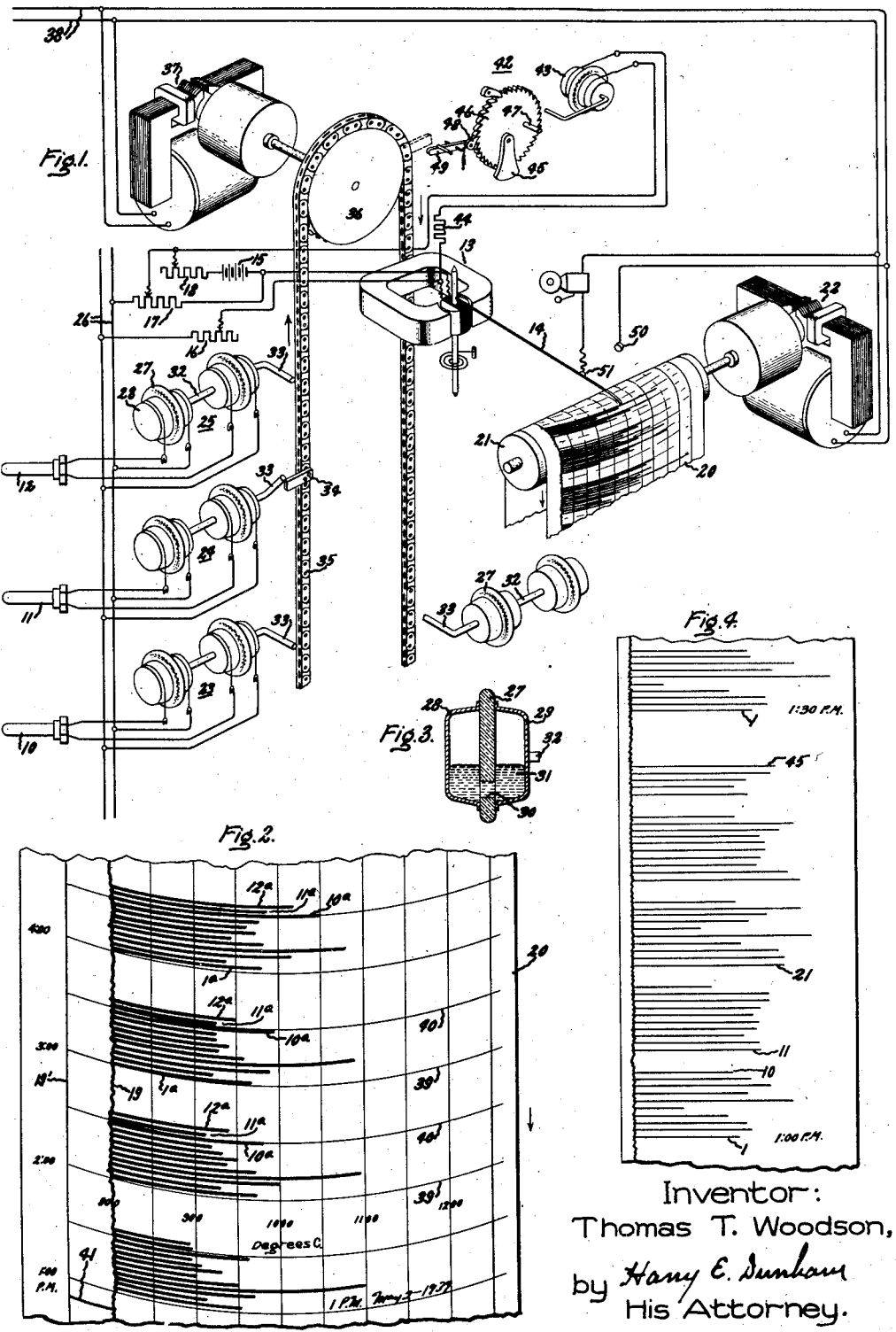
Inventor:
Thomas T. Woodson,
by Harry E. Dunham
His Attorney.

March 24, 1942.                T. T. WOODSON                2,277,427
                         MULTIPLE SEQUENCE RECORDER
                         Filed June 9, 1939          2 Sheets-Sheet 2
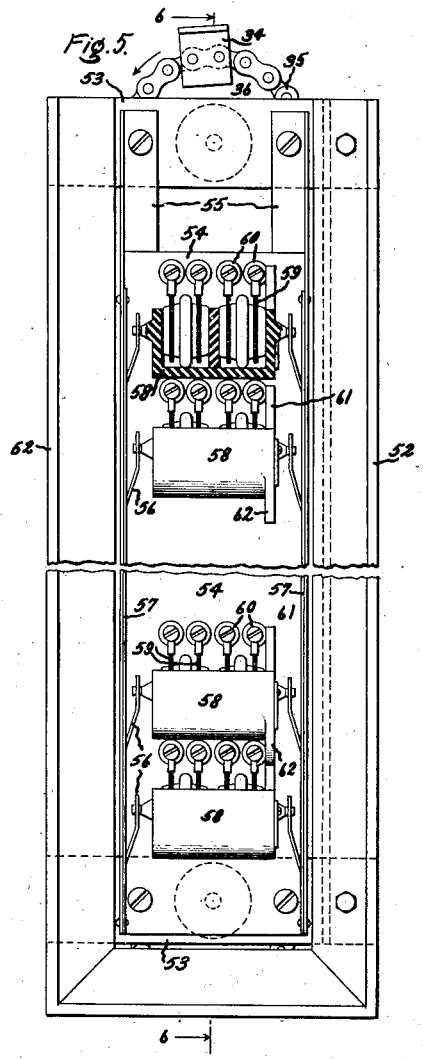
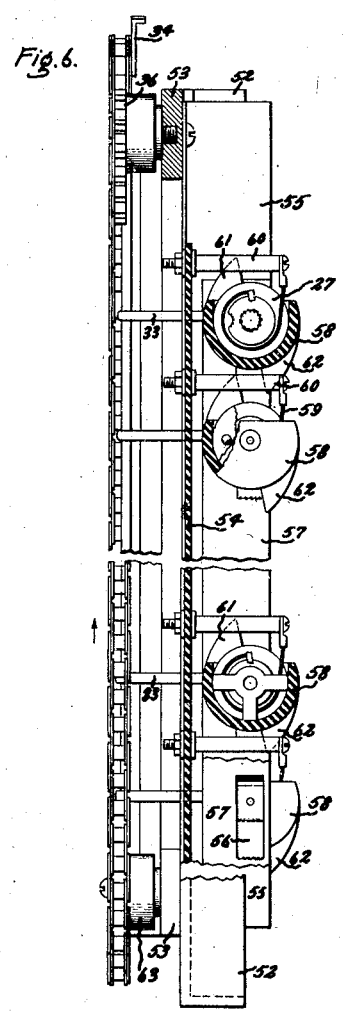
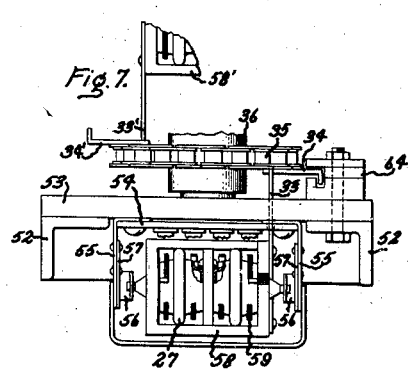
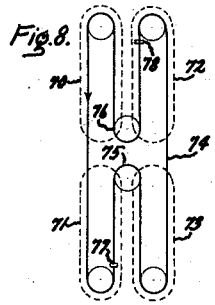
Inventor:
Thomas T. Woodson,
by Harry E. Dunham
His Attorney.

Patented Mar. 24, 1942

2,277,427

UNITED STATES PATENT OFFICE 2,277,427

MULTIPLE SEQUENCE RECORDER

Thomas T. Woodson, Schenectady, N. Y., assignor to General Electric Company, a corporation of New York Application June 9, 1939, Serial No. 278,262

3 Claims. (Cl. 234—67)

My invention relates to a method of and apparatus for recording a plurality of measurements or events on the same record sheet.

One object of my invention relates to improvements in the switching mechanism whereby different circuits are reliably connected to the recording apparatus in timed sequence. Another object of my invention relates to a method of recording whereby the records belonging to different individual measuring circuits which are connected in sequence to the recorder are identified by the manner of recording. Also, I prefer to so time the recording operations that the records in themselves designate the times at which they are made, to the end that part or all of the time markings usually provided on record sheets may be dispensed with. Another feature of the invention concerns an arrangement whereby the records show whether or not the measuring instrument circuit used with the recorder is in need of calibration.

The features of my invention which are believed to be novel and patentable will be pointed out in the claims appended hereto. For a better understanding of my invention reference is made in the following description to the accompanying drawings in which Fig. 1 represents a perspective view of recording apparatus embodying my invention, this representation being more or less diagrammatic to represent the principles involved rather than specific details: Fig. 2 shows a sample chart record taken according to the method of my invention using apparatus, part of which is shown in Fig. 1: Fig. 3 is a sectional view through a preferred form of mercury switch, several of which are to be used with my invention: Fig. 4 is another sample chart record included to indicate the flexibility of the application of my invention: Fig. 5 is a front view of a stack of mercury switches arranged in a preferred manner for use with my invention: Fig. 6 is a view partially in section along line 6—6 of Fig. 5: Fig. 7 is a top view of the stack of Fig. 5: and Fig. 8 represents a multiple stack chain drive.

In Fig. 1, 20 represents a recording chart which is advanced in the direction indicated over a drum 21 by any suitable mechanism 22. In the illustration the device 22 is a synchronous motor and hence the chart is advanced continuously at a constant rate, but in some cases, as will be subsequently explained, it is unnecessary that the chart be advanced continuously or at an exactly constant rate in order that the records be correctly timed. At 13 I have represented an electrical measuring instrument for moving a recording pen 14 across the recording chart above drum 21 in accordance with the measurement deflection of the measuring apparatus. This pen is not lifted from the chart but records continuously. In practice it has been found advisable to employ a high torque device for moving the pen, which device is controlled by a delicate measuring instrument. Such an arrangement is disclosed in United States Patent 1,897,850, February 14, 1933, to La Pierre. My invention is not concerned with the particular type of measuring apparatus used for moving the pen in response to measurements and hence for the sake of clearness, I have indicated a simple electric measuring instrument for this purpose with the understanding that my invention is not limited in this respect.

Let it be assumed that with no voltage applied to instrument 13, its zero is adjusted to such a position that pen arm 14 will draw the line 19, Fig. 2, on the chart. The battery 15 and the thermocouple 11 connected to the thermocouple bus 26 are connected so that their voltages oppose each other when connected in the instrument circuit. Then at some thermocouple temperature these opposed voltages can be made equal to each other as applied to the instrument and the instrument will record on line 19. The thermocouple temperature at which this will occur should be a temperature below the temperatures to be measured and is adjustable for a given battery voltage, by adjusting the value of the resistance at 17. Let this temperature be 800 degrees C., for example, and then we can mark the line 19 of the chart 800 degrees as indicated. For higher temperatures the thermocouple voltage will predominate and move pen 14 up-scale. Full-scale deflection can be adjusted by adjusting resistance 16. Let it be assumed that full-scale deflection is adjusted for 1250 degrees C., and this then corresponds to the temperature calibration of the chart as indicated by the temperature values marked thereon in Fig. 2. This bucking arrangement of the thermocouple and battery voltages and the use of a high resistance at 17 produces a minimum drain on the battery. If the battery voltages change, the calibration will be thrown off and it is desirable that the battery be checked periodically and if it is in need of adjustment, this is done by adjusting resistance 18 or putting in a new battery. I prefer also to have the record indicate any need of such battery voltage calibration and hence once per day, for example, I connect the battery circuit to the instrument through a switch 43 and a resistance 44 at a time when no thermocouple is connected to the instrument. This produces a reverse current through the instrument and a record such as the record shown at 41, Fig. 2, is produced below line 19. The value of resistance 44 is selected so that when the battery calibration is correct the record 41 will be of a predetermined length and a line 19', called the calibration line, may be provided on the chart for indicating the correct length of the calibration records 41. If the record 41 does not reach line 19', the battery voltage as applied to the instrument circuit is low and if this record extends beyond line 19', the battery voltage is high. If then, when measuring and recording other quantities, the records 41 remain at the desired length, it will be evident from such records that the apparatus has remained in correct calibration, and if for any reason it gets out of calibration, the record will immediately reveal such lack of calibration by departure of line 41 from the value indicated. The records 41 also serve an additional purpose as will be pointed out below.

In Fig. 1 the measuring apparatus is arranged to be connected in sequence to a plurality of thermocouples 10, 11, 12, etc. for measuring temperatures in different locations. These thermocouples are connected through mercury switches at 23, 24, 25, etc. to the measuring bus 26 and hence to the instrument 13 in a predetermined sequence and at predetermined times.

These mercury switches are preferably of the type illustrated in cross-section in Fig. 3 where 27 represents a circular central partition of refractory insulating material and the parts 28 and 29 are hub-like metal pockets sealed to the central partition. This provides a vessel having a partition through its center. The central partition has an off-center opening 30 therein and the vessel contains a small quantity of mercury 31. The vessel is rotatable with a shaft 32 about its central axis so as to be rotated to move the opening 30 from above to below the mercury level and vice versa. In the illustration, Fig. 3, the hole 30 is below the mercury level and hence the two metal parts 28 and 29, used as switch terminals, are closed through the mercury.

If the device be rotated to bring hole 30 above the mercury level, the switch will open the circuit in which it is connected. Such a switch is preferably included in each side of the circuit where thermocouples are involved, and for this purpose they are arranged in pairs on a connecting shaft 32.

The details of the preferred assembly arrangement of these switches will be explained more fully in connection with Figs. 4, 5 and 6, but for the present it will be assumed that the switches are normally biased to a rotary position where they are open. Thus, switches 23 and 25, Fig. 1, are open and the pair of switches at 24 are closed because they have been turned from the open position to a closed position by means of the operating lever 33 and an actuating member 34.

The actuating member or lug 34 is fixed on the side of a chain 35 which runs over a sprocket wheel 36 driven by a synchronous motor 37 in the direction indicated. The chain is shown broken in Fig. 1 but it will be understood that it is continuous.

The various mercury switches are arranged in stacks so that the operating levers 33 extend into the path of movement of the lug 34 on chain 35. Then as lug 34 passes by each switch, it lifts the lever 33 and closes the switch for a short interval of time. The time during which a switch is thus closed depends upon the vertical contacting width of the lug 34. As soon as the lug has passed by the lever the switch rotates back to the open position. Thus the thermocouples are connected to the measuring apparatus one after the other in sequence and when all have thus been connected to the measuring apparatus, the operation is repeated as the lug 34 completes its trip and comes around the next time. When a thermocouple is thus connected to the measuring apparatus, the voltage which is produced by reason of the temperature of the thermocouple is proportional to such temperature and the connections are such that this voltage is opposed in relation to the voltage of battery 15. Hence the instrument deflects up-scale from line 19 and draws a record such as the record 11a, Fig. 2.

It will be evident that the lug 34 or another lug may operate to close other mercury switches for connecting thermocouples to instrument 13 when the lug is moving downward, and one such switch is indicated back of the recording chart. The preferred lug arrangement for this purpose will be explained in connection with Fig. 7. Let it be assumed for the purpose of illustration that there is a group of twelve thermocouples which are connected in sequence to measuring instrument 13 and that the thermocouples shown at 10, 11 and 12 are the last three thermocouples of such group, before the sequence is repeated. Let it further be assumed that motors 22 and 37 are connected to the same source of alternating current supply 38 and hence operate synchronously with each other at constant speed. Let us assume that the motor 22 drives the chart forward the distance corresponding to the spacing between the lines 39 and 40 of chart 20, Fig. 2 every half hour and thus the spacing between lines 39—39 corresponds to one hour in time. Time graduations as indicated on the left margin of the chart in Fig. 2 may thus be marked on the chart. Let it further be assumed that motor 37 drives chain 35 with its lug 34 so as to make one complete cycle of movement of lug 34 once per hour and that the twelve switches, of which 23, 24 and 25 are examples, are so spaced along the chain that records are produced of the temperatures of the twelve thermocouples in the manner represented in Fig. 2, the records for thermocouples 10, 11 and 12 being shown at 10a, 11a and 12a. The records thus indicate that they are taken in succession three minutes apart, consuming about 36 minutes per hour and then there is a period of about 24 minutes when no records are taken except, of course, the base record line 19. This will require a spacing between levers 33 of the various switches such that the lug moves from one lever to the next in three minutes and a spacing between switch 25, the last of the series, and the first switch of the series corresponding to about twenty-four minutes in time. As thus arranged according to a prearranged program the records can give much more information than merely the records of the temperatures measured. The measuring apparatus and circuit are of course calibrated with the chart to record measurements of whatever it is that is connected thereto by the switches 23, 24, etc. In the example given, temperatures are measured and recorded. The line 19 may correspond to a temperature of 800 degrees C., for example. This means that if the recording apparatus were connected to a thermocouple maintained at 800 degrees C., the deflection and record would correspond to line 19. The temperature calibration of the chart may be marked thereon and the temperature markings indicated in Fig. 2 are for illustration purposes only, although they are practicable values.

The records in themselves identify the thermocouples to which they correspond. For example, if, for convenience, the thermocouples or their locations be given the numbers 1 to 12 inclusive, corresponding to the sequence in which they are connected to the recording apparatus, then we know that the first or lower record of a group corresponds to the temperature at thermocouple No. 1. Likewise, record 10a being the tenth record counting from the bottom of a group of records, corresponds to thermocouple No. 10, and record 12a is the record of thermocouple No. 12. The highest temperature as recorded in the example record shown in Fig. 2 is for thermocouple No. 4 at 1:12 p. m. and the lowest is for thermocouple No. 12 at 1:36 p. m. This is very desirable because it eliminates a considerable amount of apparatus heretofore employed to identify a limited number of different records, as may be illustrated in United States Patents Nos. 1,641,199 Sept. 6, 1927, and 2,118,081, May 24, 1938, and moveover the identification is simple and easy. This method of recording so as to identify different records is adaptable to practically any number of records and recording time intervals. For example, in Fig. 3 there is represented a chart record on which forty-five different records are taken every half hour. The forty-five records of a group are divided into five sub-groups, four sub-groups of ten each and one sub-group of five to make counting easier. For instance, if the record opposite 1 p. m. is record No. 1, record 21 is easily found as the first record of the third sub-group. The sub-groups may be differently spaced for further ease in identification, although this would be unnecessary where only forty-five different records are involved.

I now wish to point out that the chart driving motor 22 does not need to be synchronized with the chain driving motor 37 nor does the motor 22 need to operate at strictly constant speed. For instance, it would not destroy the record-identifying sheme if the groups of records in Figs. 2 and 3 were not exactly evenly spaced so long as they were spaced apart in a way to identify the different groups and sub-groups.

The record of Fig. 2 has time marks placed thereon for convenience in explanation and such time marks are, of course, practicable if a constant speed chart advance is used. However, I now wish to point out that the usual time marks are not required on the record sheet to obtain timed records, because the records time themselves if the motor 37 which drives the chain is a timer motor. Assume for example, that all time marks including the half hour lines 39 and 40 be removed from the chart in Fig. 2, but leaving the speed of movement of chain 35 the same as before, namely one cycle of operation per hour. Now, when the recording apparatus is initially set into operation, the operator simply adjusts the chain or the lug 34 thereon to such a position that record No. 1a is taken on the hour. Then he knows that record 10a will occur at thirty minutes past the hour, even though the chart be not advanced at a uniform rate. If desired, he may note the date and hour on the record sheet opposite the first record when the chart is put on and the apparatus initially adjusted, as indicated by the inscription "1 p. m. May 2–1939" near the lower end of chart 20, Fig. 2. Then, if the motor 37 continues to operate at constant speed, the day, hour and minute of any record taken on the chart can be determined. Since such records are inspected frequently, it will be feasible and desirable but not essential for the operator to make such a note on the record every few days. This will save counting the record groups for long distances along the chart. To further assist in this time identification, the timing motor 37 can easily be arranged to momentarily close the calibration circuit of instrument 13, say just before 1 p. m. every day to produce a record such as the record 41, Fig. 2. Such a record is then equivalent to stamping the time 1 p. m. on the record sheet each day at that time and also as pointed out above, this record shows the condition of calibration.

An arrangement for accomplishing this purpose is illustrated in Fig. 1 at 42. Here we have a switch 43 that may be of the type shown in Fig. 3. This switch is normally open. Once every 24 hours, in the example given, this switch is closed momentarily to apply a voltage derived from battery 16 alone to the measuring instrument thereby producing the mark 41 on the record sheet. The mechanism for thus closing switch 43 may comprise a rotary weight 45 and a ratchet wheel 46 having a pin 47 extending therefrom for lifting the weight 45. In the example given the ratchet wheel will have 24 teeth and it will be advanced one tooth by a pawl 48 and a pawl operating lever 49 by chain lug 34 each hour as the lug passes lever 49. Once in twenty-four hours weight 45 will be lifted to a vertical position and then fall to the position shown and in so doing will contact the operating arm of the switch 43 to momentarily move the switch to closed position. After the weight has passed the operating arm, the switch turns back to open position. This mechanism is so positioned along the path of movement of chain 35 that this operation will occur just before 1 p. m. in the example given.

In the sample record of Fig. 4 let it be assumed that the lowermost record shown, No. 1, was taken at 1:00 p. m. and that a notation to that effect was made on the chart, that the closely spaced records of the sub-group are taken one-half minute apart, and that the different sub-groups are spaced apart 1½ minutes, i. e., that record No. 10 was taken at 1:04:30 p. m. and record No. 11 at 1:06 p. m. This means then that record No. 45 will occur at 1:26:00 p. m. and the spacing between the main group, i. e. records Nos. 45 and 1, will correspond to four minutes. This timing is determined by the spacing of the various switches along the chain 35 and the fact that the chain driving motor is a timer motor. With some such suitable program or time schedule selected and adhered to, the different records are easily identified and likewise the time of the occurrence of any record can be readily determined. For example, record 21, Fig. 4 was taken at 1:12:00 p. m. in the example given and is the first record of the third sub-group starting from 1:00 p. m., reading upward opposite to the direction of chart movement.

It is seen now that by reason of the manner of recording the measurements on the chart in a predetermined sequence and in a selected time relation so as to divide the records into suitable groups, the records produce their own time markings on the chart, and charts which are pre-marked with time lines and other time markings are unnecessary. An inexpensive chart may thus be used and it is unnecessary to move the chart along to coordinate the stylus with a premarked time character thereon when putting on a new record sheet or when a portion of the chart is removed. The records are very clear and do not require an excessive amount of chart space. The number of different records that can be taken in a given time is limited only by the speed at which the recording apparatus used can properly perform its function. I have found that it is practicable to take records ten seconds apart and one hundred and fifty records per hour and have these records divided into suitable distinguishing groups and sub-groups for the purposes described above.

At 50 I have shown an alarm contact such that if any recorded temperature exceeds a predetermined amount, a contact 51 on the recording arm will reach contact 50 and close an alarm circuit.

It will be evident that motor 37, being a constant speed motor, can be used to advance the chart 20 and motor 22 then dispensed with. In many cases, however, it may be desirable to have the chain-driving motor located some distance from the recording meter, and in such cases one of the usual chart-driving arrangements, such as shown, will be preferable.

In order that the switching operations to be performed by the chain may occur with reliability and exactness and to afford the desired degree of flexibility as to the number and spacing of the different switches, I prefer to employ switching mechanism of the character shown in Figs. 5, 6 and 7. The pairs of mercury switches such as those shown at 23, 24 and 25, Fig. 1, may be arranged in stacks as shown in Figs. 5 and 6, each stack containing any desired number of such switches and one or more such stacks used with each recorder. Such stacks may comprise an upright supporting framework consisting of side members 52, and cross pieces 53 at top and bottom and elsewhere as required. The framework supports a terminal board 54 of insulating material and spaced vertical strips 55 forming supports for spaced trunnion-bearing members 56. Such members 56 may be ears cut out of strips 57 riveted or otherwise secured to strips 55. The trunnion-bearing members 56 rotatively support open top protective housings 58 of insulating material and each of these housings contains a pair of mercury switches of the type represented in Fig. 3. The axis of rotation of the housing is the same as the center axis of rotation of the cylindrical switches. These housings have a center partition and end partitions between which the mercury switches are firmly held in their proper rotative positions and by means of which the two switches of a pair are adequately insulated from each other. This is best shown in the upper housing which is shown in section in Fig. 5. It will be understood that each housing with its pair of mercury switches is freely rotatable between proper limits in its trunnion bearings. The switch terminals comprise flexible leads 59 secured at one end to the metal end sections of the switches and at the other end to terminal studs 60 mounted on the panel board 54. It will be noted that these flexible leads 59 are wrapped part way about the metal end sections of the mercury switches and have some slack when the switches are in the open position. The open positions of the switches are indicated by the horizontal position of their operating levers 33. To close a switch, the operating lever 33, as shown in Fig. 6, is raised by the lug 34 on chain 35. This may turn the holder 58 through an angle of say 30 degrees to close the switch and hold it closed while the lug 34 is passing by. The time during which a switch is thus closed for a given chain speed and angle of rotation of the switch depends upon the width of the lug, and it is contemplated that lugs of different widths will be available so that lugs may be interchanged to vary the duration of switch closure in this simple manner. A wide lug will take longer to clear the lever 33 and the switch will stay closed longer. In like manner the surface of the lever which contacts with the lug may be selected to have a dimension suitable for the desired switch closure duration. When a switch holder is thus turned in a clockwise direction, as pictured in Fig. 6, the flexible lead is tightened by a closer and further wrapping about the switch. The leads are made of such length that the slack is taken out of them when the switch is closed, but they are not stretched so tightly as to strain their terminals. As thus arranged, the leads serve as a return spring to rotate the switches back to open position as soon as the lug has cleared the operating lever. This spring action is partially by reason of the tendency of the leads to straighten out and flexible lead conductor material suitable for this purpose is selected. Ordinary flexible copper stranded lead wire is suitable. The operating levers 33 are secured to one end of the housing as best shown in Fig. 7.

It will be further noted from Figs. 5 and 6 that adjacent holders 58 have cam-like extensions 61 and 62 in line with each other, the lower extension 62 of one switch extending into the path of rotation of the upper extension 61 of the next lower switch. When all of the switches are in the open position, as represented, the adjacent in line surfaces of these extensions are spaced apart an angular distance slightly less than the angular distance of rotation of a switch member when rotating from open to closed position. This then provides an interlock between adjacent switch pairs that assures that in case a switch fails to open when it should, it will be forced open by the interlock extensions as the switch above it is being closed. Hence it is assured that the different measurement circuits will be individually and consecutively connected and disconnected from the recording instrument avoiding the possibility of more than one measurement circuit being connected to the recording instrument at any one time.

The chain 52 is hung over suitable sprocket wheels 36 and 63 rotatively supported at the tops and bottoms of a stack. One of these wheels will be driven by the motor 37, Fig. 1. Where two stacks of switches are to be operated by the same motor, the second stack may be placed back of the stack already described and a second lug 34' (see Fig. 7) is placed on the opposite side of chain 35 to operate the switches of the second stack as lug 34' moves downward. It is seen that the only change required in a stack for this purpose is to place the operating lever 33 on the opposite end of the housing and have it extend in the oposite direction. Thus, in Fig. 7 I have indicated at 33' the lever as thus reversed on the end of a housing 58' of an adjacent stack for operation by the second lug 34' as it moves downward. In order that the lugs shall be held in line on a long chain while operating a switch lever, I provide guides 64 having an L-shaped slot into which the L-shaped outer end of the lug moves. This guide extends nearly the length of the stack on the same side or sides as the switch operating levers. It is the inner end of the lug which makes contact with the operating levers. The lug or lugs are fastened on the outside of the chain and hence do not interfere with their movement over the sprocket wheels. Where two or more stacks are required, the same chain may also be lengthened and arranged to move over sprocket wheels on two or more different stacks. One such arrangement is indicated in Fig. 8 for a four stack installation.

In Fig. 8 the four stacks are indicated in outline in dotted lines at 70, 71, 72 and 73. Stacks 70 and 72 are like that of Fig. 5 except that the bottom sprocket wheels are removed. Stacks 71 and 73 are like that of Fig. 5 except that the top sprocket wheels are removed.

The chain 74 runs from the top sprocket wheel of stack 70 to the bottom sprocket wheel of stack 71, then up over an interconnecting sprocket wheel 75 to the bottom sprocket wheel of stack 73, up over the top sprocket wheel of stack 72, down under another interconnecting sprocket wheel 76 and back over the top sprocket wheel of stack 70. The chain may have two lugs 77 and 78 positioned as shown. For the direction of chain operation indicated, lug 77 will first operate the switches in stack 71 moving upward, next lug 78 will operate the switches of stack 70 moving upward, next lug 77 will operate the switches of stack 73 moving upward and then the switches of stack 72 moving upward. By this time lug 78 will approach the position in which 78 is shown and the sequence will be repeated. If there are ten switches per stack, this will be suitable for a forty sequence group in sub-groups of ten. Additional pairs of stacks can be added as desired by merely lengthening the chain and respacing the lugs accordingly.

In case it becomes desirable to provide stacks at different locations all connected to the same recorder, they may be driven by separate synchronous motors and the motors energized from the same source of supply. This is an electrical interconnection equivalent to the mechanical interconnection represented in Figs. 7 and 8. The time spacing of consecutive switch operations to obtain the type of record groupings depicted in Figs. 3 and 4 may be had by simply disconnecting and not using certain switches in the series, if such record grouping can not be obtained by reason of the absence of switching operations when the lug or lugs are passing over the sprocket wheels.

It is seen that my improved switching arrangement is adapted for wide flexibility as to the number and grouping of the switch operations and is particularly adapted for the multiple sequence recorder apparatus and method of recording which has been described.

Where thermocouples are to be connected to the recording apparatus, it has been found quite important to provide a switch in both leads of the thermocouple circuit. In cases where the events or measurements to be consecutively recorded and their circuits are of such a nature that a single circuit switch will suffice, it is evident that the switching arrangement described may be simplified by omitting one switch of a pair without other changes. The switching arrangement described gives positive opening and closing operations at predetermined times and has a contact resistance which is so low as to be negligible and which does not change.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A recording meter comprising means for advancing a chart at a substantially constant average rate, a recording stylus in continuous contact with said chart, electro-responsive apparatus for moving said stylus across the chart in response to measurements, said apparatus normally positioning said stylus in a predetermined recording position when no measurements are being recorded, a plurality of electrical circuits, time controlled switching means for individually and consecutively connecting and disconnecting said different circuits to said electro-responsive apparatus in a predetermined sequence and then repeating said sequence whereby records of the measurements are recorded on the chart in a like sequence and repetitions of the sequence, the time spacing between such switching operations being selected to produce the records in distinguishable groups spaced apart in the direction of travel of the record chart with each group containing one recorded measurement of each circuit, whereby the position of any record in a group identifies such record as belonging to a particular circuit.

2. Recording apparatus comprising means for advancing a record sheet at a substantially constant average rate, measurement responsive recording apparatus having a recording stylus in continuous recording contact with said sheet, and producing records transversely of the direction of movement of said sheet in proportion to the measurement response of such apparatus, a plurality of measuring devices, time-controlled means for individually connecting and disconnecting each of said measuring devices to said recording apparatus in a predetermined recurring sequence, whereby recurring groups of records of the measurements of said devices are produced on the record sheet in like sequence, the time spacing between the recording operations of a sequence being such as to space apart the individual records of a sequence group on the record sheet and the time spacing between the recurrence of such recording sequences being greater so as to set apart and thereby distinguish the different groups from each other, whereby the record of any particular measuring device may be readily identified on the record sheet by its position in a group.

3. Recording apparatus comprising means for advancing a record sheet at a substantially uniform average rate, measurement responsive recording apparatus having a recording pen continuously in recording contact with said sheet and producing records transversely of the direction of movement of said sheet in proportion to the measurement response of said apparatus, a plurality of measuring devices, time-controlled program apparatus for individually connecting and disconnecting each measuring device to said recording apparatus according to a predetermined recurring sequence whereby recurring groups of records of the measurements of said devices are produced on said record sheet in like sequence, the time spacing between the occurrence of the different records of a sequence group being known and predetermined such that the approximate time of the occurrence of any record of a sequence group from the beginning of the sequence is readily determined from the position of the record in the group, and the time spacing between the occurrence of different sequence groups being equal, predetermined and greater than the time spacing between the records of a group so that different sequence record groups are readily distinguished from each other and so that if the time of beginning of one sequence group is known the time of beginning of adjacent sequence groups is readily determined without calculation.

THOMAS T. WOODSON.